United States Patent [19]

Placke

[11] 3,745,449
[45] July 10, 1973

[54] METHOD AND APPARATUS FOR TESTING WELDED PIPE FOR ANOMALIES WITH MEANS TO CHANGE THE SENSITIVITY WHEN TESTING THE WELDED AREA

[75] Inventor: Eugene A. Placke, Houston, Tex.

[73] Assignee: AMF Incorporated, White Plains, N.Y.

[22] Filed: Dec. 1, 1971

[21] Appl. No.: 203,614

[52] U.S. Cl. ................................................. 324/37
[51] Int. Cl. ............................................ G01r 33/12
[58] Field of Search .................. 324/37, 40; 73/67.9

[56] References Cited
UNITED STATES PATENTS 3,345,563   10/1967   Wood .............................. 324/37
3,528,003   9/1970   Forster ............................. 324/37

Primary Examiner—Robert J. Corcoran
Attorney—George W. Price et al.

[57] ABSTRACT

Apparatus and method for nondestructively inspecting a tubular member of uniform wall thickness having a weld line extending throughout its length. Complete circumferential inspection is continuously performed by apparatus that includes electronic circuitry which is caused to operate with greater sensitivity when inspecting zone in and adjacent the weld line than when inspecting the remainder of the member.

5 Claims, 5 Drawing Figures

PATENTED JUL 10 1973　　　　　　　3,745,449

INVENTOR.
EUGENE A. PLACKE
BY
John H. Gallagher
ATTORNEY 3,745,449

METHOD AND APPARATUS FOR TESTING WELDED PIPE FOR ANOMALIES WITH MEANS TO CHANGE THE SENSITIVITY WHEN TESTING THE WELDED AREA

BACKGROUND OF THE INVENTION

In the manufacture of welded pipe and tubing a continuous strip of sheet metal is formed into tubular shape by known means so as to bring the edges of the sheet together at a weld point where they are joined by welding. The tube may be formed with a weld seam that extends linearly along the pipe, or the strip may be wound in helical fashion so that the weld seam extends helically about the pipe.

Anomalies may exist in the original strip of sheet metal and anomalies may occur in or adjacent the weld line as a result of an imperfect weld being formed during the welding operation.

Standards of acceptability for pipe intended to be used in the petroleum industry have been established by the American Petroleum Institute. According to these standards, some types and degrees of anomalies are considered noninjurious and are acceptable, and others are considered injurious but may be removed or repaired to render the pipe acceptable for its intended use. Some types of injurious anomalies render the pipe unacceptable for its intended use.

It is approved practice for a pipe manufacturer to remove or repair certain types of detected anomalies in the skelp portion of the pipe, thereby avoiding loss of a portion of its production. However, because the weld zone of welded pipe is the "weakest link" in a pipe and usually presents the greatest potential for failure in service, pipe manufacturers have been reluctant to deliver, and pipe purchasers have been reluctant to accept, pipe whose inspection record indicates that anomalies exist in the weld zone. This practice causes a considerable loss of revenue to pipe manufacturers.

When inspecting pipe by the magnetic flux leakage inspection method it has been learned that the signal levels of inspection signals emanating from anomalies in the weld zone can be lower in magnitude than inspection signals from anomalies in the skelp portion of a pipe, because of the occurence of very small flaws such as pin-holes and hairline cracks in the weld zone as opposed to generally larger flaws such as pits and gouges in the skelp portion. Consequently, it often has been difficult to determine with reasonable certainty the true nature of defects in the weld zone, and as mentioned, pipe having anomalies in the weld zone is likely to be considered unacceptable for use in the petroleum industry.

It would be of considerable benefit to pipe manufacturers to be able to inspect the weld zone of welded pipe with greater sensitivity in order to ascertain with greater certainty the nature and extent of anomalies in the weld zone so that at least some of the anomalies may be determined with reasonable certainty to be noninjurious, removable or repairable.

It usually is not desirable to nondestructively inspect the skelp portion of the pipe with such greater sensitivity because indications of inconsequential and acceptable anomalies which would appear on an inspection record or in the inspection system readout as relatively large signals, due to the increased sensitivity, and thus would contribute to confusion or to difficulty in identifying and/or separating anomaly signals which are of genuine concern.

DISCUSSION OF PRIOR ART

In U.S. Pat. No. 3,345,563 it is stated that some pipe is manufactured with a weld seam of increased thickness because the weld bead has not been trimmed or scarfed from the inside surface of the tube. That patent suggests that this is the reason for decreased sensitivity of magnetic inspection in the weld zone since the increased thickness reduces the flux density in the weld zone. According to the teachings of that patent, means are provided for monitoring the wall thickness in the weld zone of the pipe being inspected and for controlling the gain of an amplifier, or the bias level of a comparator circuit, as a direct function and inverse function, respectively, of the monitored wall thickness. The anomaly inspection signals from the weld zone of the pipe are coupled to the amplifier, or comparator, so that the sensitivity of the inspection circuitry increases as a function of wall thickness. However, a considerable quantity of pipe is produced by the high frequency electric resistance welding method. In practicing this method, and in some other welding methods as well, it is common to trim or scarf the weld bead on both the outside and inside surfaces of the pipe so that the weld zone is substantially the same thickness as the skelp portion of the pipe. See for example U.S. Pat. No. 3,015,017 which shows high frequency electric resistance welding apparatus that includes external and internal scarfing tools for scarfing away the upset weld bead. Because the pipe is of substantially uniform wall thickness throughout its complete circumference, the method of inspection described in the above-mentioned U.S. Pat. No. 3,345,563 cannot be utilized since it is useful only when the pipe is nonuniform in wall thickness.

Furthermore, the method and apparatus disclosed in the above-mentioned patent nondestructively inspects only the weld zone of the pipe. Because the condition of the skelp portion of the pipe also is of concern, separate and independently operating inspection equipment would be required to inspect the skelp.

SUMMARY OF THE INVENTION

The invention relates to a method and apparatus for nondestructively inspecting in a continuous operation the complete circumference of a welded tubular member. During the continuous operation, first sensing means scan around the surface of the member and detect the presence of potentially injurious anomalies in the skelp portion and in the weld zone of the member. Second sensing means detects only the presence of the weld line during each scan and provides a control signal to change the gain of an amplifier, for example, in signal processing circuitry so that the gain is increased for the period of time that the sensing means scans the weld zone for potentially injurious anomalies. The weld zone thereby is automatically inspected with greater sensitivity to compensate for the lower magnitude anomaly signals that otherwise would be received from the weld zone.

DESCRIPTION OF PREFERENCE EMBODIMENTS

The type of nondestructive inspection to be described herein is magnetic flux leakage inspection. Other types of nondestructive inspection may be employed in accordance with the principles of this invention.

Figure 1:
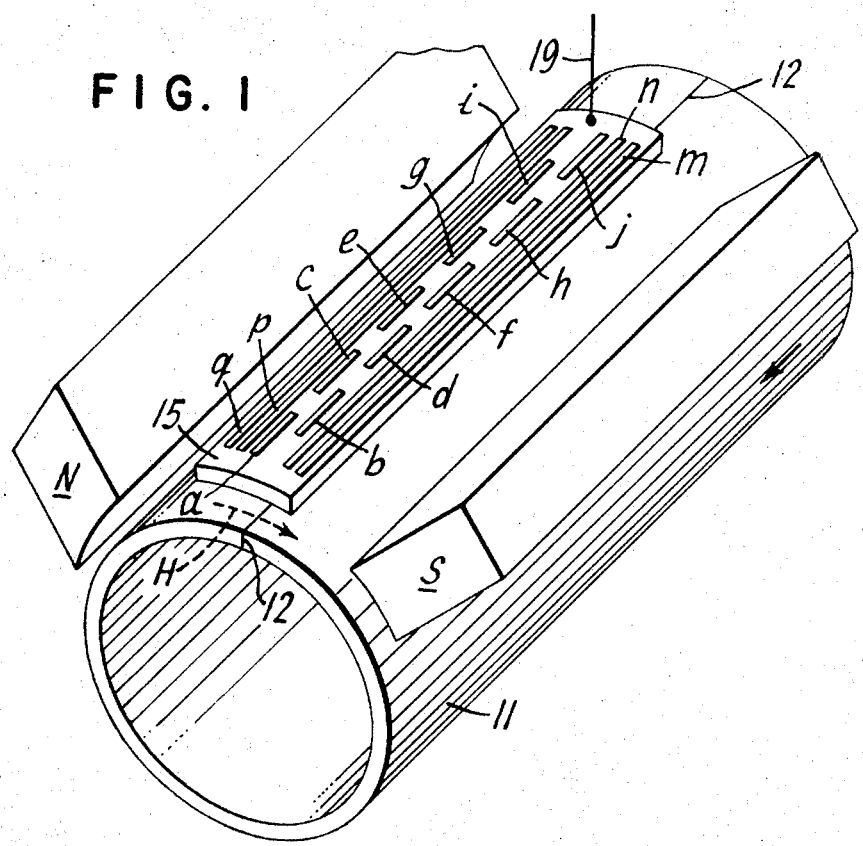
FIG. 1 is a simplified illustration of a search shoe having detector coils for detecting, respectively, the presence of a weld line in the pipe and for detecting injurious anomalies in the weld zone and in the skelp portion of the pipe.

In FIG. 1 a section of pipe 11 having a substantially uniform wall thickness and a weld seam 12 is illustrated as moving from right to left. In practice, pipe 11 may be moving along a conveyor of a pipe mill after having been welded by welding apparatus, not illustrated, located upstream from the pipe illustrated in FIG. 1.

Apparatus for nondestructively inspecting the manufactured pipe includes a sensing unit in the form of a search shoe 15 which contacts the outer surface of pipe 11 and continuously rotates about the periphery of moving pipe 11 so that a resultant helical scan of the moving pipe is achieved by search shoe 15.

Means such as the illustrated magnetic pole pieces are provided for establishing a circumferentially directed unidirectional magnetic flux field H in the wall of pipe 11, at least in the region under search shoe 15.

Search shoe 15 houses a number of anomaly detecting search coils $a$ through $j$ which are arranged across the shoe to provide a continuous scan of pipe 11. Coils $a-j$ are relatively small coils which detect the leakage flux caused by potentially injurious anomalies in the pipe and produce electrical anomaly signals that are coupled to signal processing circuitry which will be described below. Adjacent ones of the search coils may be connected in series opposition. For example, coils $a$ and $b$, $c$ and $d$, $e$ and $f$, etc., are respectively connected in series opposition. Search shoe 15 also includes relatively large search coils m and n which extend substantially completely across the leading edge of the search shoe and are connected together in series opposed relationship. Coils $m$ and $n$ are designed and constructed so that they are substantially insensitive to the usual types of potentially injurious anomalies that may be expected to be present in a welded pipe but they will produce an output signal when they pass over weld line 12.

In practice, coils $a-j$ may be flat coils that are positioned in search shoe 15 with their planar configuration parallel to the outer surface of pipe 11. Coils m and n also may be wound flat, but their planar configurations are inclined to the outer surface of pipe 11 so that only one elongated side of each coil is closely adjacent the pipe and thus is effective to detect magnetic flux variations along the surface of pipe 11.

Coils $a-j$ are relatively short in the longitudinal direction so that they will generate anomaly signals representative of the types of potentially injurious anomalies expected to be encountered in the pipe. Coils m and n are longer in the longitudinal direction and will be considerably longer than the physical dimensions of potentially injurious anomalies expected to be encountered so that, ideally, they will be relatively insensitive to anything but the continuous weld line 12. Those skilled in the art can design search coils to function as described.

The reason that coils m and n can sense the presence of weld line 12 is that the metal along the joined edges of the skelp has been heated and has undergone a metallurgical change. Furthermore, the heated metal has been forged to form the weld and/or the weld zone may contain electrode material or filler material. Therefore, the metal in the weld zone will have somewhat different magnetic properties than the remaining skelp portion of the pipe and the magnetic flux field H will be different along the weld zone than it will be throughout the remainder of the pipe. Even though this difference may be small in some instances, coils m and n will sense the weld line because they extend completely across search shoe 15 and thus intercept an appreciable length of leakage flux field along the weld zone. This is true even though there may be an insignificant physical discontinuity at the weld line, which often is the case with pipe welded by the high frequency electrical resistance welding method. In a properly operating pipe mill using that type of welding equipment and which includes scarfing tools to scarf away any weld bead that extends beyond the outer and inner surfaces of the pipe, it often is difficult to visually determine the presence of a weld line in some types of metal, even though there may be some defect in or adjacent the weld seam between the surfaces of the pipe.

Figure 2:
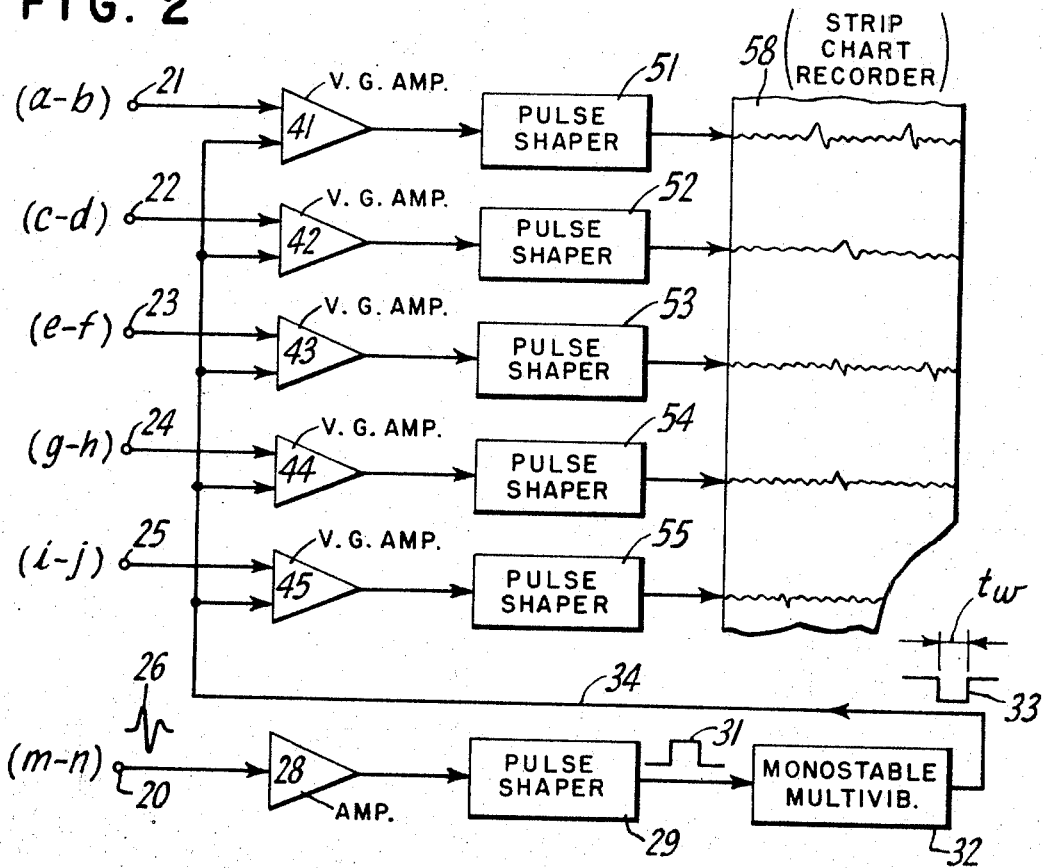
FIG. 2 is a simplified block diagram illustrating a signal processing system for processing with one sensitivity the anomaly signals emanating from the skelp portion of a pipe and for processing with a greater sensitivity the anomaly signals emanating from the weld zone of a pipe.

The signals from the connected pairs of coils in search shoe 15 are coupled over cable 19 to the signal processing circuitry of this invention which is illustrated in simplified form in FIG. 2. The weld line signal from coils m and n are coupled to terminal 20 and the anomaly signals from the pairs of coils $a$ and $b$, $c$ and $d$, $e$ and $f$, $g$ and $h$, $i$ and $j$ are respectively coupled to terminals 21–25.

A weld line signal 26 having a shape illustrated in FIG. 2 is coupled from terminal 20 to amplifier 28, and then to pulse shaping circuitry 29 whose output is a square shaped trigger pulse 31 which triggers monostable multivibrator 32. The corresponding output of multivibrator 32 is a square shaped negative going gating pulse 33 whose time duration $t_w$ is chosen to equal the time required for the anomaly detecting search coils $a-j$ to pass over the weld zone which is to be inspected with greater sensitivity. This weld zone may extend from one-quarter to one-half inch on both sides of the actual weld line and is the zone where potentially injurious anomalies are likely to be introduced during the welding operation.

The time period $t_w$ will be selected as a function of the speed of rotation of search shoe 15, and of the physical spacing of coils m and n from coils $a-j$. Gating pulse 33 is coupled through line 34 to one input of each of the variable gain amplifiers 41–45 and serves as a control signal to change the gain of each amplifier from a first value to a second value.

Terminals 21–25 are respectively coupled to the second input terminals of variable gain amplifiers 41–45 and supply to those amplifiers the respective anomaly signals produced by the pairs of search coils $a-j$. The output of variable gain amplifiers 41–45 are respectively coupled to pulse shaping circuits 51–55 whose outputs are coupled to a strip chart recorder 58 which produces a written trace of the respective signals. Other circuitry and equipment may be utilized for processing and displaying the output signals of the variable gain amplifiers 41–45 if so desired.

In the operation of the apparatus and circuitry illustrated in FIGS. 1 and 2, assuming first that search shoe 15 is scanning the skelp portion of pipe 11, coils m and n will not detect any anomalies so that no signals will appear at terminal 20, FIG. 2. Consequently, monostable multivibrator 32 is in its first stable state with its output at the higher of two levels. This output is the control signal that is coupled over line 34 to each amplifier 41–45 to set the gains of the amplifiers at a first level. Anomaly signals corresponding to potentially injurious anomalies detected in the skelp portion of pipe 11 by search coils $a-j$ will be coupled to corresponding ones of the terminals 21–25, will be amplified by variable gain amplifiers 41–45, and ultimately will be recorded by the strip chart recorder 58.

As search shoe 15 passes over weld line 12 coils m and n will sense it and will produce a weld line signal 26 that is coupled to terminal 20, and after being shaped to the square pulse 31, the weld line signal triggers monostable multivibrator 32 to its unstable second state for the time period $t_w$, thereby producing gating pulse 33. This pulse is applied to amplifiers 41–45 to increase their gains to make them more sensitive to input anomaly signals from coils $a-j$. Because of the increased gain of amplifiers 41–45, the weld zone of pipe 11 will be inspected with greater sensitivity so that the inspection record will reveal more of the nature of the weld zone.

An alternative arrangement for gating the variable gain amplifiers 41–45 is to employ a second set of weld line detecting coils $p$ and $q$ in search shoe 15, FIG. 1. These coils are substantially identical to coils m and n, but are located at the trailing edge of search shoe 15 so that they produce a second weld line signal as the trailing edge of the shoe passes over weld line 12.

Figure 3:
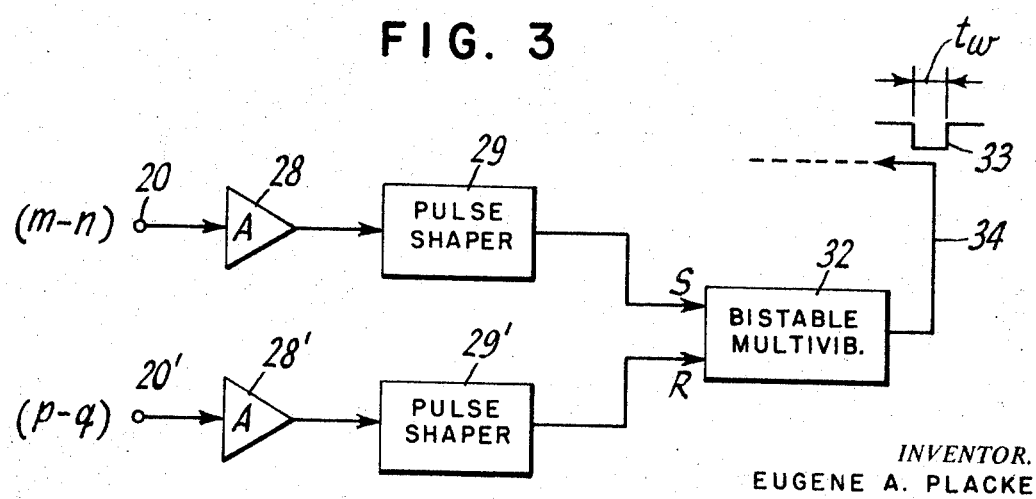
FIG. 3 is a simplified illustration of an alternative embodiment of gate producing means included in the system of FIG. 2.

Referring to FIG. 3, the multivibrator 32' is a bistable device which is set in its second stable state having the lower output level by the first weld line signal which is coupled from coils m and n to terminal 20, and is reset back to its first stable state having the higher output level by the second weld line signal which is coupled from coils $p$ and $q$ to terminal 20'. Thus the gating signal 33 on line 34 has a time of occurrence and time duration $t_w$ which assures that adjustable gain amplifiers 41–45 will be operating at their greater gain while anomaly detecting coils $a-j$ are passing over the weld zone.

Figure 4:
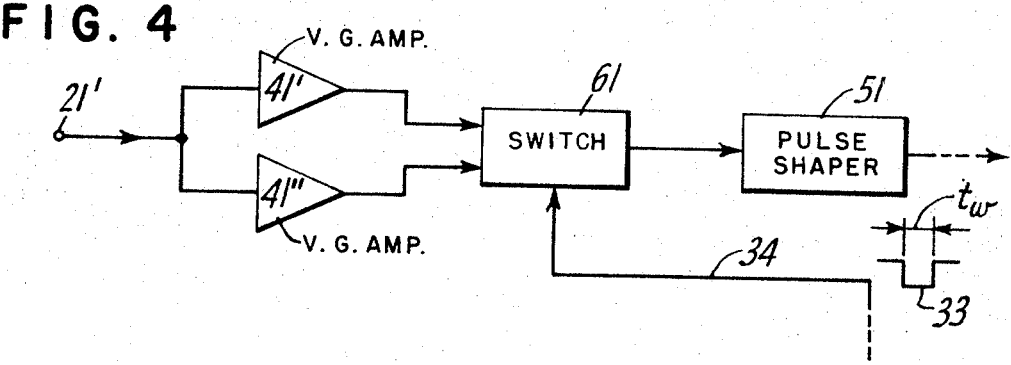
FIG. 4 is an alternative arrangement of a signal processing channel in the system of FIG. 2.

As an alternative to varying the gain of each of the amplifiers 41–45 in the respective signal processing channels illustrated in FIG. 1, two amplifiers having fixed but different gains may be employed in each channel and one or the other of the amplifiers may be switched into the signal processing circuitry in response the gating pulse 33 on line 34. FIG. 4 illustrates this type of arrangement in simplified form. Input terminal 21' is coupled in parallel to amplifiers 41' and 41''. Amplifier 41'' has a gain which is greater than the gain of amplifier 41'. The outputs of the amplifiers are coupled to switching means 61 which operates to connect only amplifier 41' to pulse shaper circuit 51 when control signal 33 on line 34 is at the higher of its levels and connect only the higher gain amplifier 41'' to pulse shaper circuit 51 when control signal 33 is at the lower of its two levels, this being the time during which the anomaly detecting coils $a-j$ are inspecting the weld zone.

As a further alternative, the characteristics of the signal processing circuitry may be changed while inspecting the skelp and weld zone by changing the reference bias level of a signal comparator circuit in each signal processing channel. That is, anomaly signals from coils $a-j$ would respectively be coupled to the input terminal of a signal comparator. The control signal 33 on line 34, or a signal corresponding thereto, would be coupled as the reference signal to the comparator. The comparator would operate to pass to its output that portion of an input signal which exceeded the magnitude the reference signal. Because the reference signal, i.e., gating pulse 33, changes in magnitude, the magnitude of signals passed by the comparator will change.

Figure 5:
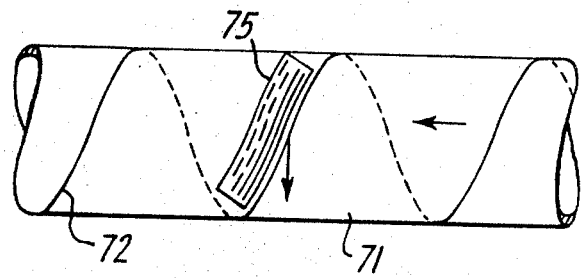
FIG. 5 is a simplified illustration of an arrangement of search coils for inspecting a welded pipe having a helical weld seam.

The principles of this invention also may be utilized in the inspection of so-called spiral welded pipe. As illustrated in FIG. 5, pipe 71 has a weld seam 72 that extends helically throughout the length of the pipe. Search shoe 75 is shaped to conform to the surface of pipe 71 and has included therein the search coils m and n, and a through j. Search shoe 75 and the coils therein are arranged parallel to weld line 72 so that when they rotate in a circular path about advancing pipe 71, weld line search coils m and n will be parallel to the weld line 72 as they pass over it. The electronic signal processing circuitry for processing the weld line signals and the anomaly signals will be the same as previously described.

In some instances the pipe may have roll marks on its outer surface. There are slight indentations or scuff marks imparted to the outer surface by shaping and forging rolls during manufacture of the pipe. In the event that these marks would undesirably generate signals in weld line search coils m and n, and $p$ and $q$, search shoe 15, FIG. 1, could be disposed on the inside of the pipe and scan along the inside surface thereof. The internal supporting structure for supporting the search shoe would be similar to that disclosed in U.S. Pat. No. 3,535,624. Appropriate means would be provided for establishing relative rotary motion between the search shoe and the pipe.

In the above examples and description the language "characteristics of the signal processing circuitry" has been used in referring specifically to the gains of amplifiers and the bias levels of comparator circuits. It is believed to be obvious that these specifically mentioned characteristics are examples of signal processing characteristics of signal processing circuitry, and such language is to be understood in the accompanying claims.

What is claimed is:

1. A method for nondestructively inspecting a tubular member having therein a weld zone that includes a weld line, wherein the wall thickness in said weld zone is substantially the same as other circumferential portions of the member but the metallurgical characteristics in the weld zone are different from the remaining portion of the member because of the weld zone having been heated during welding, wherein apparatus for performing the inspection operates with different inspecting characteristics when inspecting the weld zone and when inspecting the remaining portion, said method comprising the steps establishing relative rotary motion between the member and anomaly detecting means so that the detecting means scans completely around the member to successively scan the weld line and the remaining circumferential portion of the member, detecting injurious anomalies in said member during the relative motion and providing anomaly signals corresponding to detected anomalies, detecting the different metallurgical characteristics in the weld zone during the scanning of the member and producing weld zone control signals that occur prior in time to anomaly signals emanating from the weld zone during a scan of the member, coupling said anomaly signals and said control signals to an anomaly signal processing means which has a signal processing characteristic that is variable from a first value to a second value in response to the control signal, changing said characteristic of the signal processing means to said second value each time the weld zone is inspected for injurious anomalies.

2. Apparatus for nondestructively inspecting a tubular member having therein a weld zone that includes a weld line, wherein the wall thickness in said weld zone is substantially the same as other circumferential portions of the member but the metallurgical characteristics in the weld zone are different from other portions of the member because of the weld zone having been heated during welding, said apparatus operating with one inspecting characteristic when inspecting the weld zone and with a different inspecting characteristic when inspecting said other portions, said apparatus comprising means for detecting injurious anomalies in said member and for producing anomaly signals in response thereto, means for detecting the different metallurgical characteristics in said weld zone and for producing a control signal having one value during the time period that the means for detecting injurious anomalies is scanning said weld zone, said control signal having a different value at other times, means for establishing relative helical motion between said member and the means for detecting injurious anomalies and the means for detecting the weld zone, signal processing means having a signal processing characteristic which is variable from a first value to a second value in response to said control signal, means for coupling said anomaly signals and said control signals to said signal processing means to change said signal processing characteristic to said second value only when the control signals are at said one value.

3. Apparatus for nondestructively testing a tubular member having substantially uniform wall thickness and a weld line therein to inspect the zone of the weld line with a greater sensitivity than the remainder of said member, comprising a search unit having first and second detecting means, means for establishing relative rotary motion between said search unit and said member so that said search unit scans completely around the member to successively scan the weld line and the remaining portion of said member, said first detecting means being constructed and arranged to detect potentially injurious anomalies in said member, including potentially injurious anomalies in the zone of said weld line, and to produce anomaly signals in response thereto, said second detecting means being constructed and arranged to detect said weld line and to produce only weld line signals in response thereto, said two detecting means being arranged so that the second one passes by the weld line before the first one during said relative motion, signal processing means having a signal processing characteristic which is variable from a first value to a second value in response to a control signal, means coupling said first detector means to said signal processing means for supplying anomaly signals to be processed by the processing means, means coupling said second detector means to said signal processing means for supplying control signals to cause the processing means to exhibit one value of said characteristic when the first detecting means is inspecting the zone of the weld line and to exhibit another value of said characteristic when the first detecting means is inspecting the remainder of the member.

4. Apparatus for nondestructively inspecting a tubular member having therein a weld zone that includes a weld line, wherein the wall thickness in said weld zone is not substantially different from other circumferential portions of the member, said apparatus operating with one inspecting characteristic when inspecting the weld zone and with a different inspecting characteristic when inspecting said other portions, said apparatus comprising a search unit having first and second detecting means, means for establishing relative helical motion between said search unit and said member so that the search unit successively scans said weld zone and the remaining portion of said member, said first detecting means being constructed and arranged to detect injurious anomalies in said member, including injurious anomalies in the weld zone, and to produce anomaly signals in response thereto, said second detecting means being constructed and arranged to detect said weld zone and to produce only weld zone signals corresponding to the detected weld zone, said second detecting means being constructed, arranged and operated to produce weld zone signals prior to anomaly signals which correspond to anomalies in the weld zone as the search unit scans the weld zone, signal processing means having a signal processing characteristic which is variable from a first value to a second value in response to a control signal, means coupling said first detector means to said signal processing means for supplying anomaly signals to be processed by the signal processing means, means responsive to said weld zone signals for producing control signals which have one value for a time period that commences when the second detecting means detects the weld zone and terminates when the first detecting means passes beyond the weld zone, said control signals having a different value at other times, means for coupling said control signals to the signal processing means to change said signal processing characteristic to the second value when the control signals are at said one value.

5. Apparatus for nondestructively inspecting a tubular member having therein a weld zone that includes a weld line, wherein the wall thickness in said weld zone is substantially the same as other circumferential portions of the member but the metallurgical characteristics in the weld zone are different from other portions of the member because of the weld zone having been heated during welding, said apparatus operating with one inspecting characteristic when inspecting the weld zone and with a different inspecting characteristic when inspecting said other portions, said apparatus comprising a search unit having first and second detecting means, means for establishing relative helical motion between said search unit and said member so that the search unit successively scans said weld zone and the remaining portion of said member, said first detecting means being constructed and arranged to detect injurious anomalies in said member, including injurious anomalies in the weld zone, and to produce anomaly signals in response thereto, said second detecting means being constructed and arranged to detect the different metallurgical characteristics in said weld zone and to produce only weld zone signals corresponding to the different metallurgical characteristics in the weld zone, said second detecting means being constructed, arranged and operated to provide weld zone signals prior to said anomaly signals, signal processing means having a signal processing characteristic which is variable from a first value to a second value in response to a control signal, means coupling said first detector means to said signal processing means for supplying anomaly signals to be processed by the signal processing means, means responsive to said weld zone signals for producing control signals which have one value for a time period that commences when the second detecting means detects the weld zone and terminates when the first detecting means passes beyond the weld zone, said control signals having a different value at other times, means for coupling said control signals to the signal processing means to change said signal processing characteristic to the second value when the control signals are at said one value.

* * * * *